United States Patent [19]

Vincent

[11] 3,959,518

[45] May 25, 1976

[54] PROCESS FOR PRODUCING IMPROVED FISH MEAL, AND FISH OIL BY-PRODUCT

[76] Inventor: Daniel B. Vincent, P.O. Box 5478, Tampa, Fla. 33605

[22] Filed: May 23, 1973

[21] Appl. No.: 363,145

Related U.S. Application Data

[63] Continuation of Ser. No. 225,490, Feb. 11, 1972, abandoned.

[52] U.S. Cl. .............................. 426/643; 426/647; 426/437; 426/456
[51] Int. Cl.² ...................................... A23L 1/325
[58] Field of Search ........... 426/149, 212, 388, 478, 426/643, 646, 647, 657, 456, 464, 465, 495, 807, 437; 260/412

[56] References Cited

UNITED STATES PATENTS

| | | | |
|---|---|---|---|
| 2,573,907 | 11/1951 | Humphreys | 214/14 |
| 2,595,180 | 4/1952 | Vincent | 99/7 |
| 2,667,416 | 1/1954 | McFee | 99/7 |
| 3,295,982 | 1/1967 | Hickey | 99/2 |
| 3,359,115 | 12/1967 | Lanz | 99/7 |
| 3,551,163 | 12/1970 | Vincent | 99/2 |
| 3,586,515 | 6/1971 | Anderson | 99/209 |

FOREIGN PATENTS OR APPLICATIONS

| | | | |
|---|---|---|---|
| 548,665 | 12/1957 | Canada | 99/7 |

*Primary Examiner*—Hiram H. Bernstein
*Attorney, Agent, or Firm*—Cushman, Darby & Cushman

[57] ABSTRACT

Fish are cooked and pressed. Oil may be separated from the first press liquor and recovered. The first press liquor remainder is concentrated to about 30–50 percent solids and intimately mixed with the first press cake and reabsorbed thereinto. Then the resulting mixture is pressed again and dried to produce a fish meal product containing substantially all of the solids originally present in the fish, but minus most of the water and optionally minus some of the oil originally present. Press waters, pumping waters and the like are recycled to minimize environmental effect. A flow control means is preferably used to ensure that sufficient concentrated first press liquor is added back to the first press cake to maintain a reasonably steady state material balance in the system.

4 Claims, 1 Drawing Figure

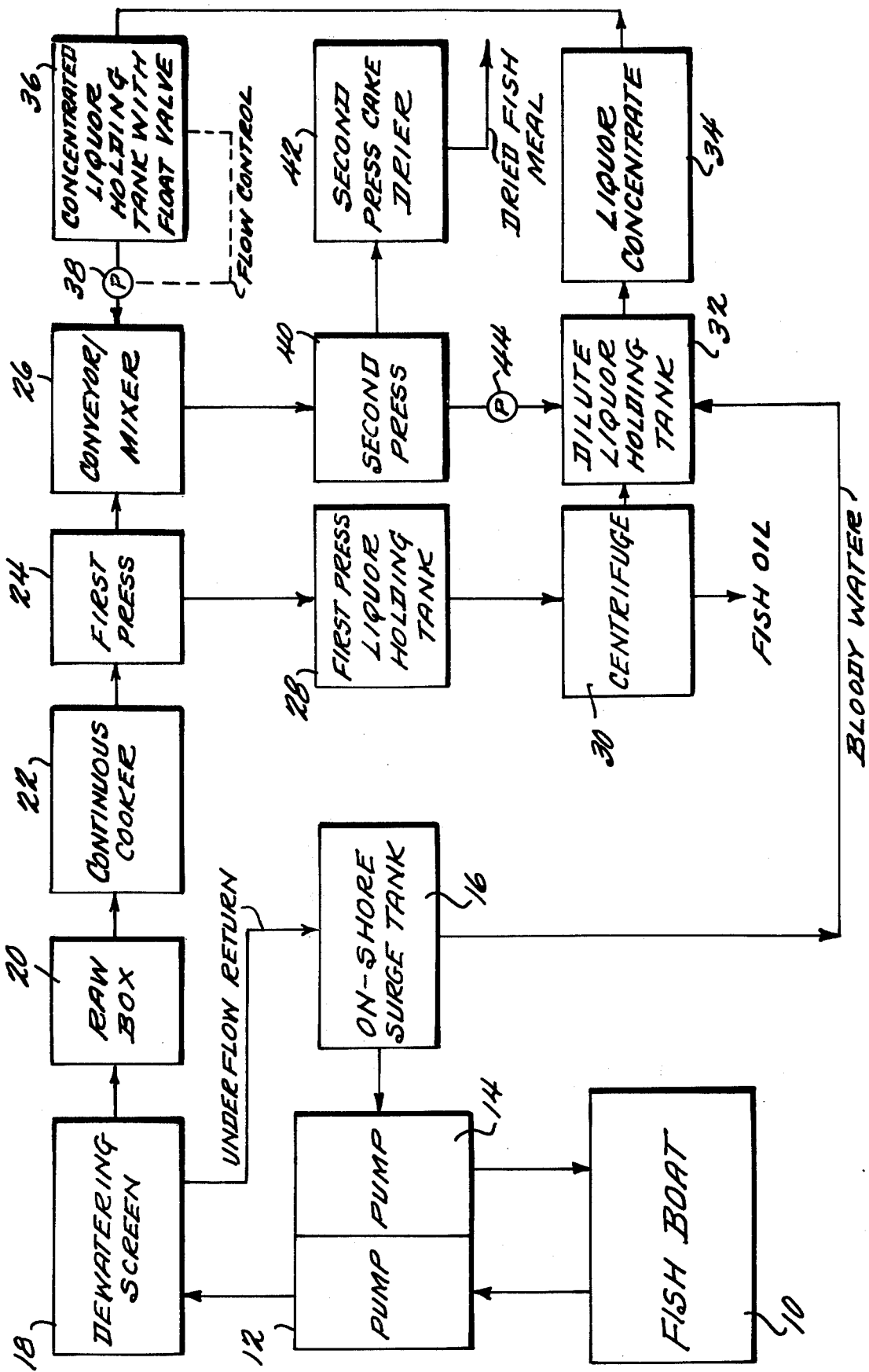

PROCESS FOR PRODUCING IMPROVED FISH MEAL, AND FISH OIL BY-PRODUCT

This is a continuation of application Ser. No. 225,490 filed Feb. 11, 1972 and now abandoned.

BACKGROUND OF THE INVENTION

Processing of fish both whole and as a by-product of other operations such as waste from filleting or canning is a large and important business all over the world.

The objective of most waste operations and a large volume of the whole fish processing is to produce an animal or poultry feed in dry form.

The method most generally used is that of the menhaden and related sardine industry. Here the fish are steam cooked and passed directly to a press which produces a solid phase known as press cake which is dried to produce fish meal, and a liquid phase known as raw water, the latter containing considerable quantities of fish oil, which is removed e.g. via a centrifugal pump. The liquor is then concentrated to a syrup of about 50% solids known as fish solubles. The resulting fish solubles is a syrupy, pungent cheesy-odor liquid.

This product is quite valuable as it contains about 70% protein on a dry basis and valuable amino acids, and an unknown growth factor when fed to poultry, hogs or mink.

But it is sticky and too viscous to pump when cold at a concentration much above 50% solids.

Only 40 pounds of the concentrated solubles per ton of broiler mash is required to supply the necessary amino acids and growth factor for commercial broiler feeding. Obviously, it is difficult for the feed manufacturer to blend this small amount of pasty, sticky solubles in liquid form uniformly into a 2,000 lb. batch of dry broiler mash so that a small chick will get the uniform required amount of this valuable material in its daily food.

Many attempts have been made to reduce the solubles to a dry powder, but the dry solubles are so hygroscopic they quickly reabsorb moisture from the air and become sticky and pasty.

Other attempts have been made to dry the concentrated solubles back into the press cake, but the results have not been satisfactory as the solubles form a sticky film on the surface of each particle of pressed fish causing much of the material to stick to the inside shelves of a dryer and burn.

As a result of the above conditions, concentrated fish solubles are a drug on the market, and it is difficult to find a home for all that can be produced even at one-half the price of fish meal. Large quantities of concentrated fish solubles are on hand unsold in the U.S.A., Chile and Peru.

SUMMARY OF THE INVENTION

I have found that the above conditions can be overcome and all of the original proportion of dissolved solids to insoluble solids in the original fish, including the blood and solids in the bail water (less any oil that might have been removed) can be reabsorbed into the press cake and dried to produce whole meal even better and more easily than if dried from press cake only.

This is accomplished by concentrating the mixed deoiled raw water, bail water and press water from the second press, preferably using my flash evaporator and heat recovery system as shown and described in my U.S. Pat. No. 3,349,827, to a concentration of about 30 to 50% solids.

The principles of the invention will be further hereinafter discussed with reference to the drawing wherein a preferred embodiment is shown. The specifics illustrated in the drawing are intended to exemplify, rather than limit, aspects of the invention as defined in the claims.

BRIEF DESCRIPTION OF THE DRAWING

In the drawing:

The FIGURE is a schematic layout of apparatus for carrying out the process described herein.

DETAILED DISCUSSION OF THE PRESENTLY PREFERRED EMBODIMENT

The fish boat 10 ties alongside a dock which is fitted with an unloading pump 12 and a circulating pump 14. Water from an on-shore supply tank 16 is delivered to the circulating pump. The fish are thus pumped from the ship and delivered to a dewatering screen 18 in the plant. Here the fish are screened off into a raw box 20, and the water passing through the screen is returned to the surge tank 16 for further circulation. This water, known as bail water, soon becomes charged with blood and fish particles and becomes difficult and expensive to concentrate using available commercial processing facilities, and therefore, has been dumped overboard and discarded until now.

By the present process this waater can be concentrated and the solids in it can be recovered and absorbed into the fish meal.

The screened fish go directly to a continuous cooker 22 in which steam is injected to break down the fish flesh and release the fish oil.

The cooked fish are then pressed in a first press 24. The press cake falls into a mixing and delay conveyor 26, e.g. a cut flight screw conveyor.

The press liquor goes to tank 28, then to centrifuge 30 to remove the fish oil. The deoiled water goes to tank 32 into which is also sent the bloody water from tank 16.

From tank 32 the mixed liquor is sent to a liquor concentrating system 34 (preferably a heat economy system as described in U.S. Pat. No. 3,349,827) in which the liquor is concentrated to about 30 to 50% solids and sent to a holding tank 36.

From this tank concentrate is pumped in controlled amounts by a variable speed, positive delivery pump 38 into the combination mixing and retention conveyor 26 in which it is mixed with the incoming press cake from press 24.

The mixture is held and continuously moved in the conveyor/mixer 26 for about three minutes in intimate contact to permit diffusion and a material balance of the soluble solids throughout the mass, and to arrive at a new liquid solution proportionate to the new total amount of water to dissolved solids.

This mixture of press cake and concentrated solubles is then sent to a second press 40, as described in Vincent U.S. Pat. No. 3,400,654, from which a press cake containing all of the solids (both dissolved and insoluble solids, less the oil removed in the centrifuge) is sent to a dryer 42 to dry the product producing a whole meal.

The press liquor from the second press is sent by pump 44 to tank 32 for mixing and further concentration with the other liquors held there.

Tank 36 is of sufficient capacity to hold several times as much concentrated solubles as would be obtained from a 5 or 10 minute conventional run of the plant and is initially charged with this amount of concentrated solubles from a prior run of the plant up to a predetermined mark from the bottom of the tank indicating the quantity of liquor in the tank.

Tank 36 is provided with a liquid level indicating instrument (for instance, a conventional float valve), which in turn actuates a conventional control device to raise or lower the flow rate of concentrated solubles through pump 38 on into mixing conveyor 26.

Any change in the amount of dissolved solids removed from the fish being unloaded from boat 10 will result in a change in the liquid level of the concentrate in tank 36, provided the concentration of the liquors from concentrator 34 is maintained at the same concentration. However, the concentrator provides a further adjustment capability.

Should the quantity of fish from boat 10 or the quantity of dissolved solids removed by the press 24 fall off, the final concentration reading in tank 36 will also fall off, causing the liquid level device of the tank 36 to reduce the flow of liquor into mixing conveyor 26. The opposite will occur from an increase from the boat, resulting in a complete absorption of all of the solubles into the fish meal over a day's run, and held-back supply of solution for beginning of the next day's run. A conventional charge of sulphuric acid can be added to the held-back liquor at the end of each run to prevent spoilage of the solution until the arrival of the next load of fish; however, no acid is needed during the operating period because the whole meal product keeps well in storage when dried to less than 10% moisture.

I have found that the press cake, including all of the soluble solids, is more easily dried in the dryer 42 than press cake without the solubles. Attempts have been made in the past to add solubles to the press cake and then dry the mixture, but the mixture becomes a sticky mass before all the solubles can be added to the mixture and cause a sticky mass that adheres to the lift flights in the dryer. As opposed to this condition, the soupy mass going to the second press is squeezed in the flights of the second press, forcing the excess liquor over the particles of fish flakes in the press and tending to wash the surface of each particle, thereby removing the sticky nature from the surface of each particle without affecting the increased solid solubles absorbed in the press cake. Feeding tests have shown that menhaden meal containing the solubles is more digestable than the standard menhaden fish meal.

Observe that the entire system is automatic, assuring absorption into the final fish meal of all the solids in the original fish (less oil removed in the centrifuge). The only manual control necessary is the control of concentration of the liquor in the concentrating evaporator.

This concentration can be changed as desired. However, I have found that a liquid concentration of about 40% solids produces the best results as at this point it is more easily concentrated than at greater concentration, and at the same time provides a good differential between the concentrated solubles and the soluble solids existing in the press cake just after the pressing operation.

The process may be varied from the preferred embodiment, e.g. by being operated upon filleting waste, etc., rather than upon whole fish; by using alternative means, such as solvent extraction for separating the oil from the fish or first press liquor; by consolidating or separating steps and apparatus where feasible, and the like.

It is preferred that the dried fish meal have a moisture content of about 3 to 10 percent.

The described retention time of three minutes in the conveyor/mixer 26 is not fixed time. The time actually needed is somewhat dependent upon the efficiency of the equipment. What is needed is a sufficient delay so that the liquid added back to the press cake is substantially uniformly distributed throughout the mixture and has achieved substantially a steady state with respect to loss of solids from the concentrated liquor to the material of the first press cake.

It is unnecessary to remove all of the oil from the fish, and this is generally impractical in a commercial processing facility. Generally, as much oil is recovered as a separate product as would be recovered in a fish meal production process which did not add solubles back to the press cake.

There follows a table which compares the analysis of fish meal produced in accordance with what is described herein as the present commercial method, with that produced in accordance with the present invention.

Table I

| | Processing One Million Typical Menhaden Fish (667,000 Pounds) | | | | | |
|---|---|---|---|---|---|---|
| | Conventional Fish Meal 140,000 lbs. | | Solubles 60,000 lbs. | | Whole Fish Meal of the Invention 172,150 lbs. | |
| Moisture | 6.5% | 9,100 | 49.9% | 29,940 | 11,190 | 6.5% |
| Protein | 62.1 | 87,030 | 30.3 | 18,180 | 105,210 | 61.1 |
| Fat | 8.3 | 11,620 | 7.7 | 4,620 | 16,240 | 9.42 |
| Fiber | .7 | 980 | .1 | 60 | 1,040 | .60 |
| N.F.E. | 4.2 | 5,870 | 2.6 | 1,560 | 7,430 | 4.33 |
| Mineral | 18.2 | 25,400 | 9.4 | 5,640 | 31,040 | 18.05 |
| | 100.0% | 140,000 lbs. | 100.0% | 60,000 lbs. | 172,150 lbs. | 100.00% |

Table I presents the feed analysis of menhaden fish meal with no solubles added, of solubles concentrated to 50+% solids, and whole meal produced by the double pressing system of the invention in which all of the solids in the solubles are added to and become part of the final whole fish meal.

While there may appear to be very little change in the chemical analysis of the final whole meal as compared to the standard fish meal, when the whole meal is fed to poultry or hogs, it has been found to increase the digestion factor by about 10% over that of conventional fish meal. This is undoubtedly due to an unknown growth factor that is present more in the soluble proteins than in the total proteins retained in the fish meal without solubles. In feeding tests on solubles produced on the flash evaporator disclosed in my earlier U.S. Pat. No. 2,818,917 as compared to solubles produced on standard steam tube evaporators, a leading mixed feed manufacturer found that solubles produced on the flash evaporator grew 3 lb. broilers in 8 weeks instead of the 10 weeks it takes when feeding like fowl without the solubles. Only 40 lbs. of solubles per ton of mixed feed is all that was required to produce these results. Similar feed tests with the whole meal produced with this double pressing system has obtained similar results.

It has further been found that the temperature to which the solubles are subjected had a great deal to do with the unknown growth factor. Solubles concentrated at a temperature above 185° appear to be subject to a rapid decrease in digestibility and the unknown growth factor.

The amount of solubles added back to the press cake is preferably in excess of the amount of solubles that would have occurred from the press liquor. Otherwise, there would not be enough solids left in the press cake after the second press to equal the total solids in the original material. Actually, the inventor prefers to add back about twice the amount of solubles which would normally have occurred from the material being treated.

Table II

Example of Average Menhaden Fisheries Operation
Per One Million Fish
(Approximately 667,000 Lbs.)
Oil Recovery Not Considered

| | |
|---|---|
| 70 tons Meal at $170.00 | $11,900.00 |
| 30 tons Solubles - $50.00 | 1,500.00 |
| 30 tons Solubles = 15 tons Solids, 15 tons Moisture | |
| Equivalent Meal with 10% Moisture = | 16.65 ton |
| Extra Water to evaporate | 14.35 ton |
| Fuel Cost based Bunker C at 7 cts. per gal. 14.35 × 2000 lbs. = 28,700 × 1200÷ 150,000 = 230 gal. Bunker C at 7 cts. = $16.10 | |
| 30 tons becomes 16.65 tons of meal × $170.00 = | $2,830.00 |
| Cost to evaporate extra moisture 230 gal. Bunker C at 7 cts. | 16.10 |
| | $2,813.90 |
| Less present value solubles at $50.00 ton | 1,500.00 |
| Increased income per million fish | $1,314.00 |

It is preferred that, when processing menhaden, the press cake be deoiled, as described, but there are times, e.g. when processing other varieties of fish, that there is not enough oil in the meal to warrant the oil extraction step.

It should now be apparent that the process for producing improved fish meal, and fish oil by-product as described hereinabove possesses each of the attributes set forth in the specification under the heading "Summary of the Invention" hereinbefore. Because the process for producing improved fish meal, and fish oil by-product of the invention can be modified to some extent without departing from the principles of the invention as they have been outlined and explained in this specification, the present invention should be understood as encompassing all such modifications as are within the spirit and scope of the following claims.

What is claimed is:

1. A process for producing improved fish meal from fish, comprising:
   A. cooking the fish;
   B. expressing a first press liquor from the cooked fish, leaving a first press cake containing a higher percentage of solids and a lower percentage of moisture than the cooked fish had;
   C. concentrating the first press liquor to about 30–50 percent solids, by weight, by evaporating moisture therefrom below a temperature of 185°F;
   D. mixing the concentrated first press liquor with the first press cake to produce a mixture substantially richer in soluble solids than the fish entering step (A);
   E. establishing a moisture balance within the mixture by providing a time delay of about three minutes between steps (D) and (F);
   F. expressing a second press liquor from the mixture, leaving a second press cake containing a total amount of solids substantially equal to the total amount of solids in the fish entering step (A);
   G. recycling the second press liquor for comingling with and concentration with the first press liquor; and
   H. drying the press cake.

2. The process of claim 1, further comprising the steps of:
   I. intermediate steps (B) and (C), separating from said first press liquor of step (B) a majority of the fish oil therein;
   (J). holding the concentrated deoiled first press liquor produced in step (D) in a vessel prior to mixing it with the first press cake;
   K. sensing the amount of concentrated deoiled first press liquor held in the vessel; and
   L. controlling the amount of concentrated deoiled first press liquor withdrawn from the vessel and forwarded for mixing in response to said sensing, to maintain a substantially steady state add back of solids to the first press cake.

3. The process of claim 1 including drying the second press cake to about 10 percent moisture content by weight.

4. The process of claim 2 including the preliminary steps of:
   A. pumping the fish ashore from a boat in a stream of water;
   B. separating the fish which have been pumped ashore from said stream;
   C. circulating said stream to a surge tank;
   D. recirculating said stream from the surge tank to the boat to provide the stream of step (A); and
   E. withdrawing sufficient bloody liquid from said surge tank to maintain a generally constant amount of liquid in the circulation loop of said stream, and combining the withdrawn bloody liquid with the comingled press liquors of step (I) for concentration therewith.

* * * * *